(12) United States Patent
Singh (10) Patent No.: US 11,928,379 B2
(45) Date of Patent: Mar. 12, 2024

(54) INFORMATION ORIENTATION AND DISPLAY IN EXTENDED REALITY ENVIRONMENTS

(71) Applicant: Citrix Systems, Inc., Fort Lauderdale, FL (US)

(72) Inventor: Manbinder Pal Singh, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 110 days.

(21) Appl. No.: 17/666,646

(22) Filed: Feb. 8, 2022

(65) Prior Publication Data

US 2023/0251809 A1 Aug. 10, 2023

(51) Int. Cl.
| | |
|---|---|
| *G06T 7/70* | (2017.01) |
| *G06F 3/14* | (2006.01) |
| *G06F 9/54* | (2006.01) |
| *G06T 11/00* | (2006.01) |
| *G06V 20/20* | (2022.01) |

(52) U.S. Cl.
CPC ................ *G06F 3/14* (2013.01); *G06F 9/543* (2013.01); *G06T 7/70* (2017.01); *G06T 11/00* (2013.01); *G06V 20/20* (2022.01); *G06T 2207/30244* (2013.01)

(58) Field of Classification Search
CPC ............ G06F 9/543; G06T 7/70; G06V 20/20
See application file for complete search history.

(56) References Cited

U.S. PATENT DOCUMENTS

| | | | |
|---|---|---|---|
| 2018/0204365 A1* | 7/2018 | Lee ............................ | G06T 7/55 |
| 2021/0286502 A1* | 9/2021 | Lemay ................... | G06F 3/017 |

\* cited by examiner

*Primary Examiner* — Samantha (Yuehan) Wang (57) ABSTRACT

Methods and systems for causing display of notes in an extended reality (XR) environment are described herein. A computing device may provide, to a user and via an XR device, an XR environment. The computing device may receive an indication that the user is presenting content. The computing device may capture one or more images of a physical environment around the XR device, then process the images to identify a location of a camera. The computing device may retrieve text corresponding to the content being presented and cause display, in the XR environment and based on the location, of the text. In this manner, the computing device may orient the eyes of the user towards a camera during presentation of content.

20 Claims, 7 Drawing Sheets

INFORMATION ORIENTATION AND DISPLAY IN EXTENDED REALITY ENVIRONMENTS

FIELD

Aspects described herein generally relate to extended reality (XR), such as virtual reality, augmented reality, and/or mixed reality, and hardware and software related thereto. More specifically, one or more aspects describe herein provide ways in which notes, documents, or other information may be displayed in an XR environment in a manner that orients eyes of a speaker to a camera during presentation of content.

BACKGROUND

During presentation of content (e.g., a speech, a slide deck), a speaker may refer to a script, notes, and/or other content for reference. For example, while presenting a slide in a slide deck, a speaker may refer to notes corresponding to that slide, such that they remember points that they wanted to make regarding the slide. As presentations are increasingly made via computing devices (and, e.g., on video teleconferencing calls) it is not uncommon for speakers to look away from a camera and instead look at, e.g., a nearby display device, such as a computer monitor. For example, a speaker presenting slides on a video conference may continually look at a secondary monitor, rather than towards a webcam, in order to refer to their presentation notes. In such a circumstance, the quality of the presentation may be negatively impacted because, for instance, the speaker may appear to be speaking away from the listeners, and/or may appear to be distracted or disinterested.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

XR display devices, such virtual reality (VR) headsets, augmented reality (AR) headsets, smart glasses, smart contact lenses, and the like, provide users many different types of XR environments (e.g., a virtual reality environment, an augmented reality environment, and/or a mixed reality environment). For example, a worker in an office may use augmented reality glasses to display content on top of real-world content visible through the lens of the glasses. In this manner, the worker may be able to interact with real-world, physical objects (e.g., paper, laptops, etc.) while also interacting with virtual objects in the XR environment (e.g., three-dimensional content displayed on a display of an XR device).

To overcome limitations in the prior art described above, and to overcome other limitations that will be apparent upon reading and understanding the present specification, aspects described herein are directed towards providing content in an XR environment so as to orient the eyes of a user towards a camera during presentation of content. A computing device may use cameras of an XR device to capture and process images of a physical environment around the XR device. That XR device might comprise, for example, smart glasses, smart goggles, smart contact lenses, a VR headset, an AR headset, or the like. Based on those images, the computing device may determine a location of a camera, such as a webcam above a laptop screen. The computing device may, in response to detecting that a user is presenting content and that the webcam is being used for that presentation, cause display, in the XR environment, of information (e.g., notes such as text corresponding to slide notes, a script) at a location, in the XR environment, corresponding to the location of the camera. For example, the computing device may cause display of the text by causing display, in the XR environment, of a virtual object that comprises the text. In this manner, when a speaker looks at information (e.g., their speech notes and/or a script) in the XR environment, their eyes will be directed in the general direction of a camera, such that it appears that the speaker is looking at listeners.

As will be described further herein, a computing device may provide, to a user and via an XR device, an XR environment. The computing device may receive an indication that the user is presenting content. The computing device may capture, using a first camera of the XR device, one or more images of a physical environment around the XR device. The computing device may then process the one or more images to identify a first location, in the physical environment around the XR device, of a second camera. The computing device may then retrieve text corresponding to the content and cause display, in the XR environment and based on the first location, of the text so as to orient eyes of the user toward the second camera during presentation of the content.

The computing device may process the one or more images by performing object detection. For example, the computing device may process the one or more images to identify the first location by processing the one or more images to identify one or more objects in the physical environment around the XR device, and then determining that at least one of the one or more objects comprises the second camera.

The computing device may detect that content is being presented via one or more office suite Application Programming Interfaces (APIs). For example, the indication that the user is presenting content may comprise an indication, from an API of an office suite application, that a slide of a presentation is being presented.

The content displayed in the XR environment may be retrieved from a variety of sources. For example, the computing device may retrieve the text corresponding to the content by determining an identifier of the content, and then retrieving, from a server and based on the identifier of the content, the text.

The computing device may modify presentation of content in the XR environment based on changes to the presentation. For example, the computing device may receive a second indication that the user has switched from presenting the content to presenting second content. In that circumstance, the computing device may, in response to receiving the second indication, retrieve second content (e.g., one or more second notes) corresponding to the second content, then cause display, in the XR environment and based on the first location, of the second content.

As part of displaying the notes in the XR environment, the notes may be hidden from other display devices. For example, the computing device may prevent display, by a display device, of the text.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards using XR devices to display content (e.g., notes, a script) associated with presentations in a manner which orients the eyes of a presenter towards a camera. This has the benefit of ensuring that the presenter appears to speak to listeners, making the presentation feel more personal and real, and avoiding the circumstance where the presenter appears to be fixated on a nearby display device. To achieve this functionality, a computing device may use an XR device to detect cameras in a physical environment, then generate and display, in an XR environment, virtual objects comprising notes based on the location of the camera(s) in the physical environment. In this way, while the speaker may be in fact looking at their own notes in the XR environment, the speaker appears to be looking towards the camera.

As will be discussed in greater detail below, the present disclosure has a large number of improvements over conventional physical and electronic methods of implementing presentation notes. The present disclosure leverages XR devices to display notes in a manner which obviates the need for dedicated teleprompters or similar devices. Moreover, the present disclosure operates in a manner that does not require speakers to reconfigure their workspace in order to place a camera nearby a display device, so as to feign the effect of them looking at a camera when in fact looking at a display device. For example, the present disclosure allows a user to refer to their notes while looking directly at a camera, even if there are no display devices near the camera.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Figure 1:
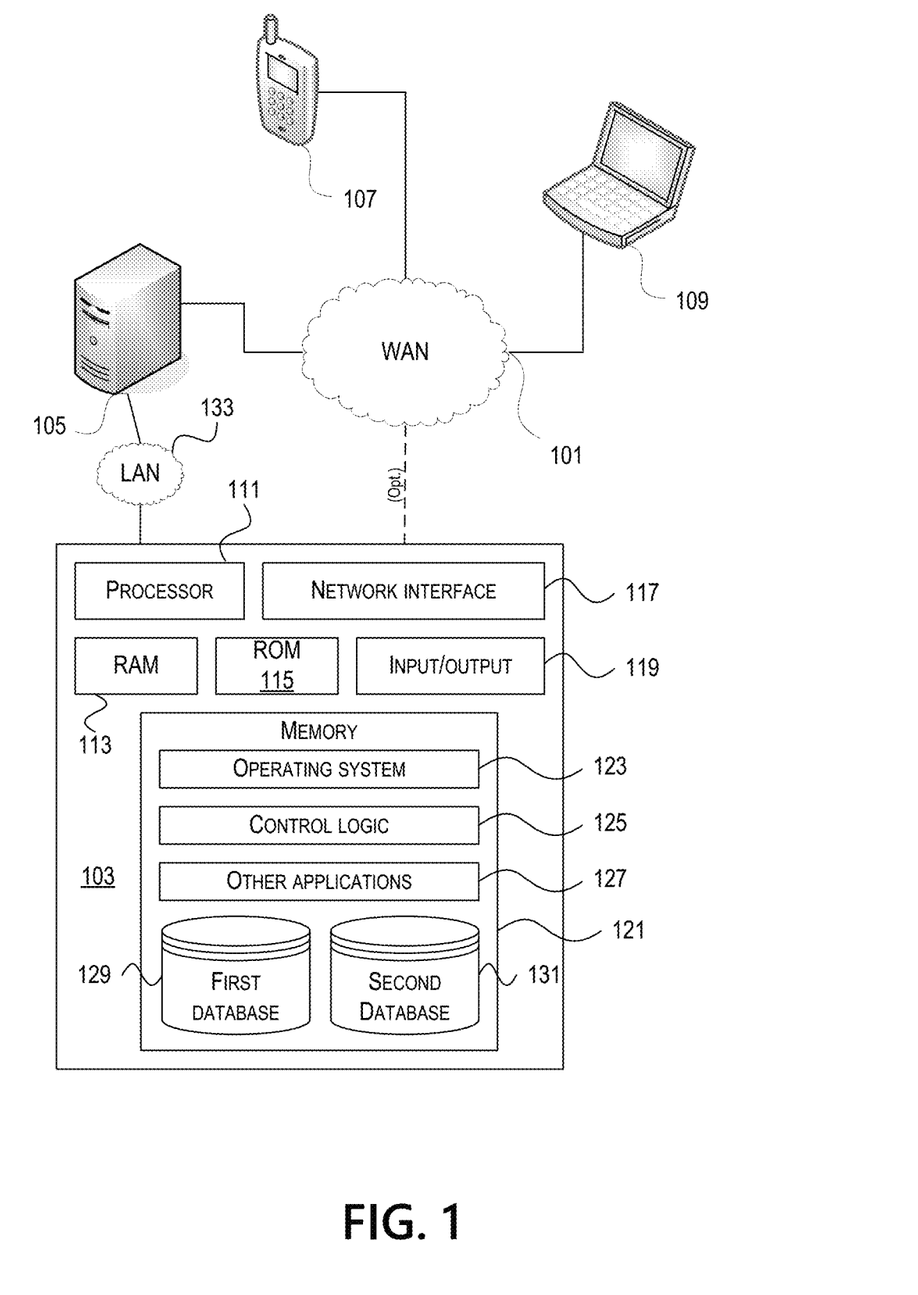
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
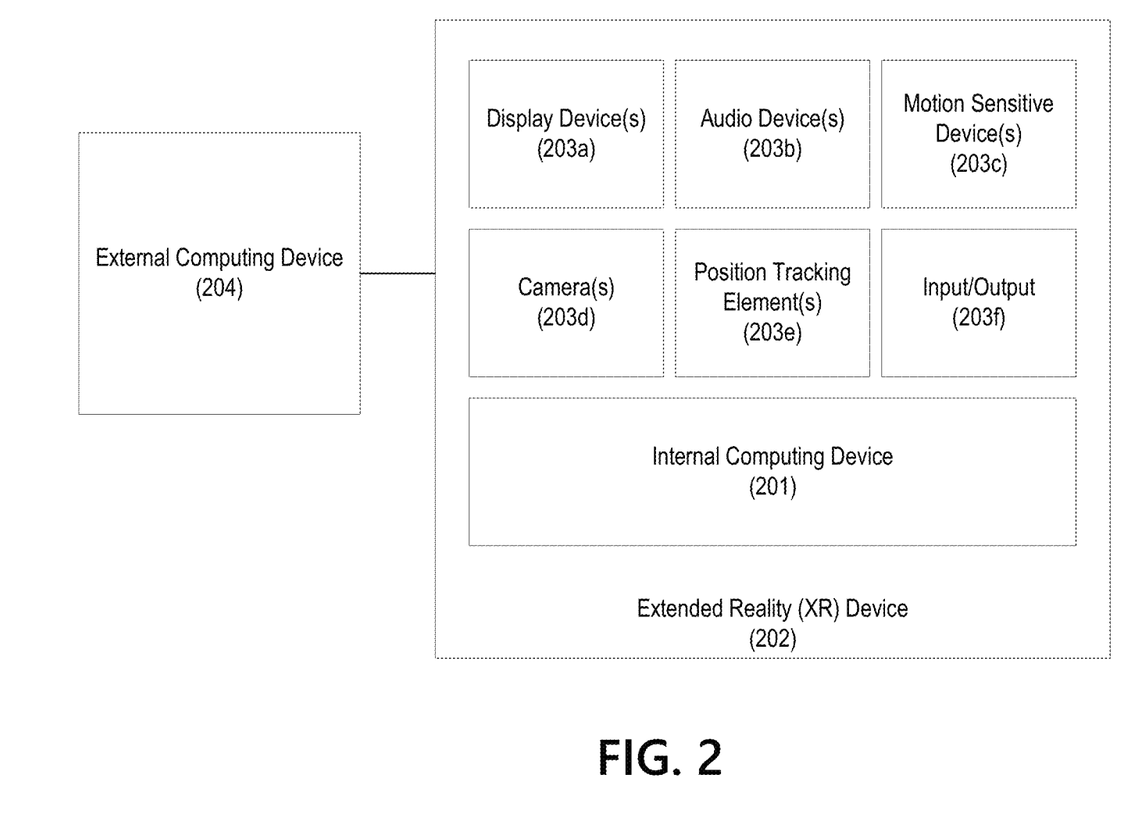
FIG. 2 depicts an illustrative extended reality (XR) device.

FIG. 2 depicts an example of an XR device 202. The XR device 202 may be configured to provide a XR environment (e.g., a virtual reality (VR), augmented reality (AR), and/or mixed reality (MR) environment). The XR device 202 may be communicatively connected to a external computing device 204, which may be the same or similar as one or more of the devices 103, 105, 107, and 109. The XR device 202 may comprise a plurality of different elements, such as display devices 203*a*, audio devices 203*b*, motion sensitive devices 203*c*, cameras 203*d*, position tracking elements 203*e*, and input/output 203*f*. Such elements may additionally and/or alternatively be referred to as sensors. Other such elements, not shown, may include in-ear electroencephalographic (EEG) and/or heart rate variability (HRV) measuring devices, scalp and/or forehead-based EEG and/or HRV measurement devices, eye-tracking devices (e.g., using infrared), or the like. The XR device 202 may further comprise a internal computing device 201, which may be the same or similar as the devices 103, 105, 107, and 109. Not all elements shown in FIG. 2 need to be present for operation of the XR device 202. For example, the XR device 202 may lack an internal computing device 201, such that the external computing device 204 may directly interface with the display devices 203*a*, the audio devices 203*b*, the motion sensitive devices 203*c*, the cameras 203*d*, the position tracking elements 203*e*, and/or the input/output 203*f* to provide an XR environment. As another example, the internal computing device 201 may be sufficiently powerful enough such that the external computing device 204 may be omitted. Though the internal computing device 201 and external computing device 204 use the terms internal and external for the purposes of illustration in FIG. 2, these devices need not be, for example, located within or outside of housing of the XR device 202. For example, the external computing device 204 may be physically mounted to the XR device 202, a user of the XR device 202, or the like. As another example, the internal computing device 201 may be physically distant from other elements of the XR device 202 and, e.g., connected to those elements by a long cable.

The external computing device 204 and/or the internal computing device 201 need not have any particular processing power or functionality to provide an XR environment. The external computing device 204 and/or the internal computing device 201 may comprise, for example, relatively underpowered processors which provide rudimentary video and/or audio. Alternatively, the external computing device 204 and/or the internal computing device 201 may, for example, comprise relatively powerful processors which provide highly realistic video and/or audio. As such, the external computing device 204 and/or the internal computing device 201 may have varying levels of processing power.

The XR device 202 may provide a VR, AR, and/or MR environment to the user. In general, VR environments provide an entirely virtual world, whereas AR and/or MR environments mix elements in the real world and the virtual world. The XR device 202 may be a device specifically configured to provide an XR environment (e.g., a VR headset), or may be a combination of devices (e.g., a smartphone inserted into a headset) which, when operated in a particular manner, provides an XR environment. The XR device 202 may be said to be untethered at least in part because it may lack a physical connection to another device (and, e.g., may be battery powered). If the XR device 202 is connected to another device (e.g., the external computing device 204, a power source, or the like), it may be said to be tethered. Examples of the XR device 202 may include the VALVE INDEX VR device developed by Valve Corporation of Bellevue, Washington, the OCULUS QUEST VR device sold by Facebook Technologies, LLC of Menlo Park, California, and the HTC VIVE VR device sold by HTC Corporation of New Taipei City, Taiwan The XR device 202 may additionally and/or alternatively include similar forms of virtual reality, augmented reality, and/or mixed reality devices, including but not limited to smart glasses, smart googles, smart contact lenses, and the like. For example, the XR device may additionally and/or alternatively comprise smart glasses, such as the GOOGLE GLASSES device sold by Google, LLC of Mountain View, California Examples of the XR device 202 may also include smartphones which may be placed into a headset for VR purposes, such as the GEAR VR product sold by Samsung Group of Seoul, South Korea. Examples of the XR device 202 may also include the AR headsets sold by Magic Leap, Inc. of Plantation, Florida, the HOLOLENS MR headsets sold by Microsoft Corporation of Redmond, Washington, and NREAL LIGHT headsets sold by Hangzhou Tairuo Technology Co., Ltd. of Beijing, China, among others. Examples of the XR device 202 may also include audio-based devices, such as the ECHO FRAMES sold by Amazon, Inc. of Seattle, Washington. All such VR devices may have different specifications. For example, some VR devices may have cameras, whereas others might not. These are merely examples, and other AR/VR systems may also or alternatively be used.

The external computing device 204 may provide all or portions of an XR environment to the XR device 202, e.g., as used by a tethered OCULUS RIFT. For example, the external computing device 204 may provide a video data stream to the XR device 202 that, when displayed by the XR device 202 (e.g., through the display devices 203a), shows a virtual world. Such a configuration may be advantageous where the XR device 202 (e.g., the internal computing device 201 that is part of the XR device 202) is not powerful enough to display a full XR environment. The external computing device 204 need not be present for the XR device 202 to provide an XR environment. For example, where the internal computing device 201 is sufficiently powerful, the external computing device 204 may be omitted, e.g., an untethered OCULUS QUEST.

The display devices 203a may be any devices configured to display all or portions of an XR environment. Such display devices 203a may comprise, for example, flat panel displays, such as one or more liquid-crystal display (LCD) panels. The display devices 203a may be the same or similar as the display 106. The display devices 203a may be singular or plural, and may be configured to display different images to different eyes of a user. For example, the display devices 203a may comprise one or more display devices coupled with lenses (e.g., Fresnel lenses) which separate all or portions of the displays for viewing by different eyes of a user.

The audio devices 203b may be any devices which may receive and/or output audio associated with an XR environment. For example, the audio devices 203b may comprise speakers which direct audio towards the ears of a user. As another example, the audio devices 203b may comprise one or more microphones which receive voice input from a user. The audio devices 203b may be used to provide an audio-based XR environment to a user of the XR device 202.

The motion sensitive devices 203c may be any elements which receive input related to the motion of a user of the XR device 202. For example, the motion sensitive devices 203c may comprise one or more accelerometers which may determine when a user of the XR device 202 is moving (e.g., leaning, moving forward, moving backwards, turning, or the like). Three dimensional accelerometers and/or gyroscopes may be used to determine full range of motion of the XR device 202. Optional external facing cameras 203d may be used for 3D orientation as well. The motion sensitive devices 203c may permit the XR device 202 to present an XR environment which changes based on the motion of a user. The motion sensitive devices 203c may additionally and/or alternatively comprise motion controllers or other similar devices which may be moved by a user to indicate input. As such, the motion sensitive devices 203c may be wholly or partially separate from the XR device 202, and may communicate via the input/output 203f.

The cameras 203d may be used to aid in the safety of the user as well as the presentation of an XR environment. The cameras 203d may be configured to capture images of one or more portions of a physical environment around the XR device 202. The cameras 203d may additionally and/or alternatively be used to monitor the surroundings of a user so as to avoid the user inadvertently contacting elements (e.g., walls) in the real world. The cameras 203d may additionally and/or alternatively monitor the user (e.g., the eyes of the user, the focus of the user's eyes, the pupil dilation of the user, or the like) to determine which elements of an XR environment to render, the movement of the user in such an environment, or the like. As such, one or more of the cameras 203d may be pointed towards eyes of a user, whereas one or more of the cameras 203d may be pointed outward towards an environment around the XR device 202. For example, the XR device 202 may have multiple outward-facing cameras that may capture images, from different perspectives, of a physical environment surrounding a user of the XR device 202.

The position tracking elements 203e may be any elements configured to aid in the tracking of the position and/or movement of the XR device 202. The position tracking elements 203e may be all or portions of a system of infrared emitters which, when monitored by a sensor, indicate the position of the XR device 202 (e.g., the position of the XR device 202 in a room). The position tracking elements 203e may be configured to permit "inside-out" tracking, where the XR device 202 tracks the position of one or more elements (e.g., the XR device 202 itself, a user's hands, external controllers, or the like) or "outside-in" tracking, where external devices aid in tracking the position of the one or more elements.

The input/output 203f may be configured to receive and transmit data associated with an XR environment. For example, the input/output 203f may be configured to communicate data associated with movement of a user to the external computing device 204. As another example, the input/output 203f may be configured to receive information from other users of in multiplayer XR environments.

The internal computing device 201 and/or the external computing device 204 may be configured to provide, via the display devices 203a, the audio devices 203b, the motion sensitive devices 203c, the cameras 203d, the position tracking elements 203e, and/or the input/output 203f, the XR environment. The internal computing device 201 may comprise one or more processors (e.g., a graphics processor), storage (e.g., that stores virtual reality programs), or the like. In general, the internal computing device 201 may be powerful enough to provide the XR environment without using the external computing device 204, such that the external computing device 204 need not be required and need not be connected to the XR device 202. In other configurations, the internal computing device 201 and the external computing device 204 may work in tandem to provide the XR environment. In other configurations, the XR device 202 might not have the internal computing device 201, such that the external computing device 204 interfaces with the display devices 203*a*, the audio devices 203*b*, the motion sensitive devices 203*c*, the cameras 203*d*, the position tracking elements 203*e*, and/or the input/output 203*f* directly.

The above-identified elements of the XR device 202 are merely examples. The XR device 202 may have more or similar elements. For example, the XR device 202 may include in-ear EEG and/or HRV measuring devices, scalp and/or forehead-based EEG and/or HRV measurement devices, eye-tracking devices (e.g., using cameras directed at users' eyes, pupil tracking, infrared), or the like.

Figure 3:
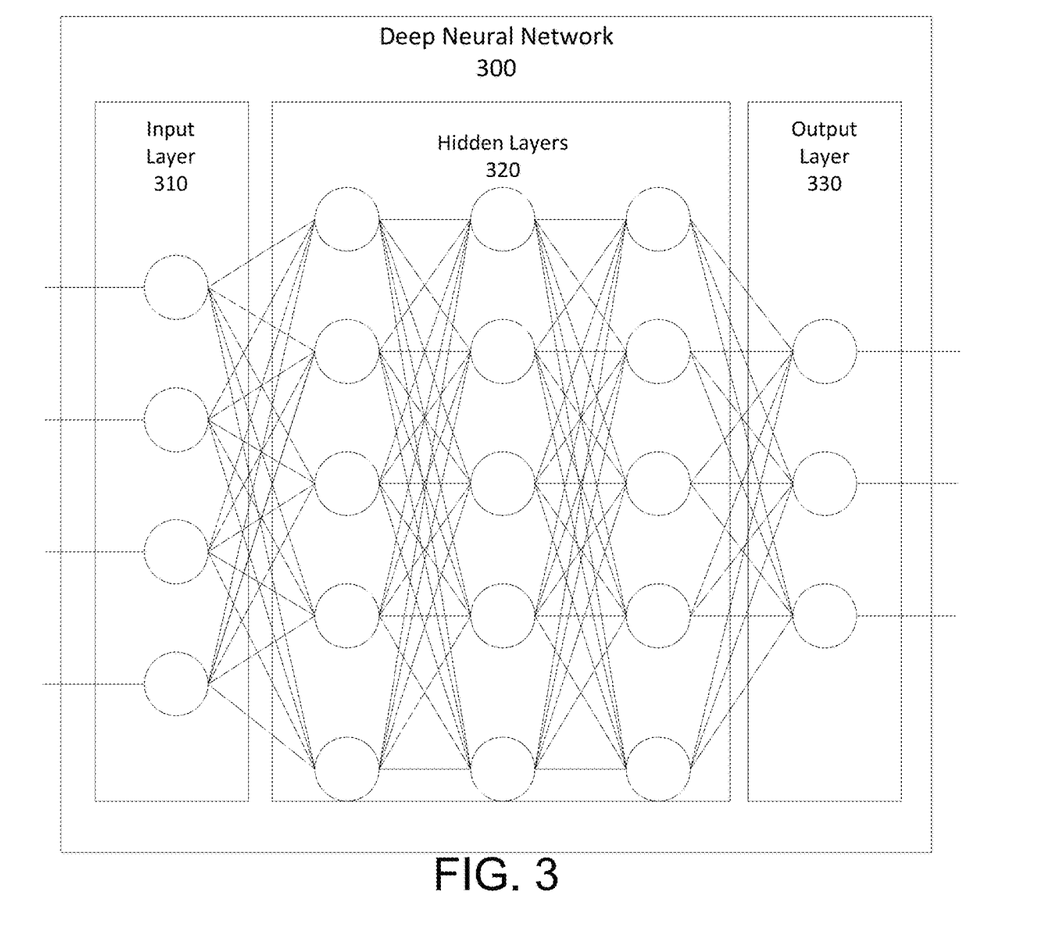
FIG. 3 depicts an example deep neural network architecture for a model according to one or more aspects of the disclosure.

FIG. 3 depicts an example deep neural network architecture 300. The architecture depicted in FIG. 3 need not be performed on a single computing device, and may be performed by, e.g., a plurality of computers (e.g., any one of the devices depicted in FIG. 1 or FIG. 2). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 310, one or more hidden layers 320, and an output layer 330. A deep neural network, as used herein, may be an artificial network that has more than one hidden layer. Illustrated network architecture 300 is depicted with three hidden layers, and thus may be considered a deep neural network. The number of hidden layers employed in deep neural network architecture 300 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 4:
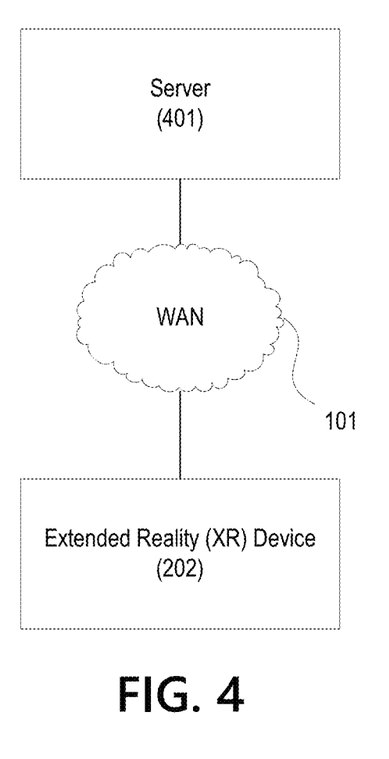
FIG. 4 depicts an XR device connected to a server via a network.

FIG. 4 shows the XR device 202 connected, via the network 101, to a server 401. The server 401 may be a computing device the same or similar as the devices 103, 105, 107, and 109. Additionally and/or alternatively, the server 401 may be the same or similar as the external computing device 204. The server 401 may be configured to generate all or portions of an XR environment displayed by the XR device 202. For example, the XR device 202 may receive, via the network 101, data (e.g., a video stream) from the server 401, and the data may comprise a virtual object which may be displayed in an XR environment. Advantageously, the server 401 may have superior computing power as compared to the XR device 202, such that content generated by the server 401 (e.g., virtual objects rendered by the server 401) may have a superior graphical quality as compared to the XR device 202.

The server 401 may additionally and/or alternatively store notes for a presentation. For example, the XR device 202 may be worn by a user during a presentation, and the XR device 202 may, during that presentation, receive, from the server 401, notes corresponding to the presentation. As such, as will be described in greater detail below, the notes need not be stored on the XR device 202 or a computing device that is physically nearby the XR device 202.

Figure 5:
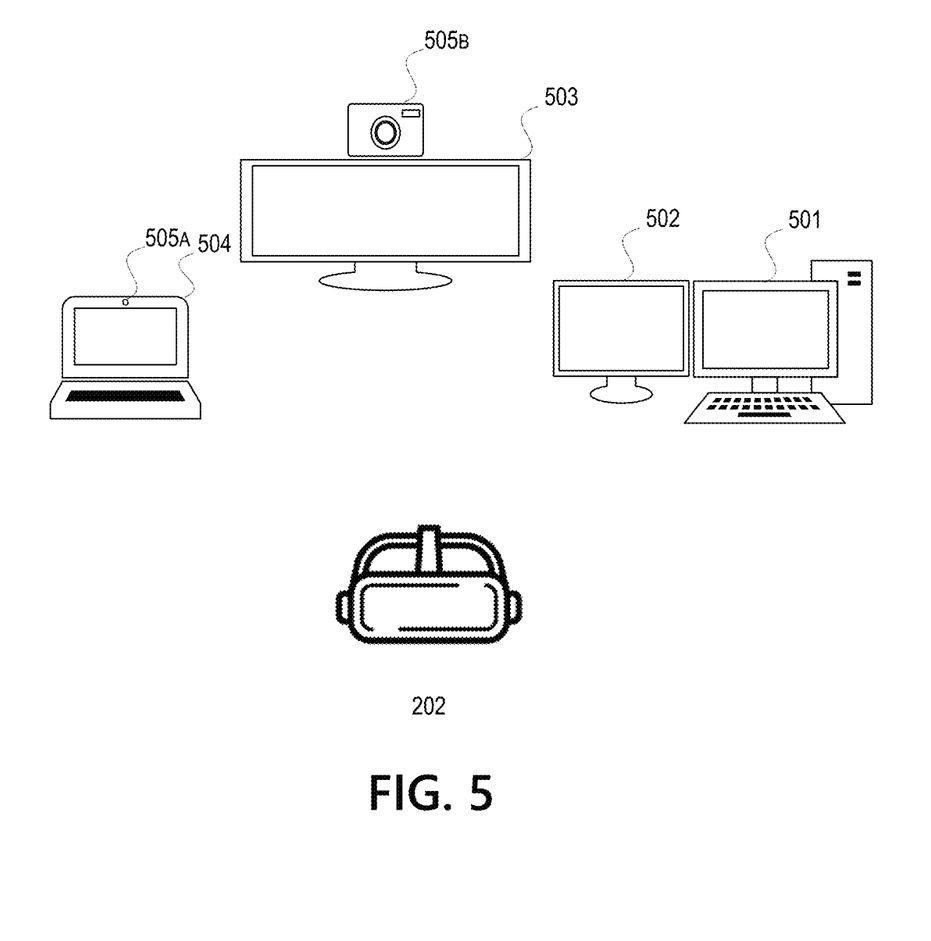
FIG. 5 depicts a physical environment about an XR device, including examples of different cameras.

FIG. 5 depicts a physical environment around the XR device 202. Depicted in FIG. 5 are four different display devices: a first monitor 501, a second monitor 502, a television 503, and a laptop screen 504. All such display devices may be referred to as physical display devices or real display devices in that they exist in a real-world physical environment about the XR device 202, and might not necessarily be displayed in any sort of XR environment. Also displayed are various cameras. Particularly, there is a first camera 505*a* nearby the laptop screen 504 and a second camera 505*b* on top of the television 503. These cameras are example of cameras which may be used to capture video and/or audio of a user (e.g., a user wearing the XR device 202) during a presentation. For example, the XR device 202 may comprise augmented reality glasses worn by a presenter during a presentation that is being recorded by the second camera 505*b*, with the television 503 being used to display video feed of various attendees of the presentation.

Display devices, such as the first monitor 501, the second monitor 502, the television 503, and the laptop screen 504, may display content generated by one or more computing devices. For example, the first monitor 501 and the second monitor 502 may display different portions of a desktop environment generated by a desktop computer. As another example, the television 503 may display video content generated by a set-top box, a video game console, or the like.

Extended Reality Note Display During Presentations

Having discussed several examples of computing devices, display devices, cameras, and XR devices which may be used to implement some aspects as discussed further below, discussion will now turn to notifications which may be displayed in XR environments.

Figure 6:
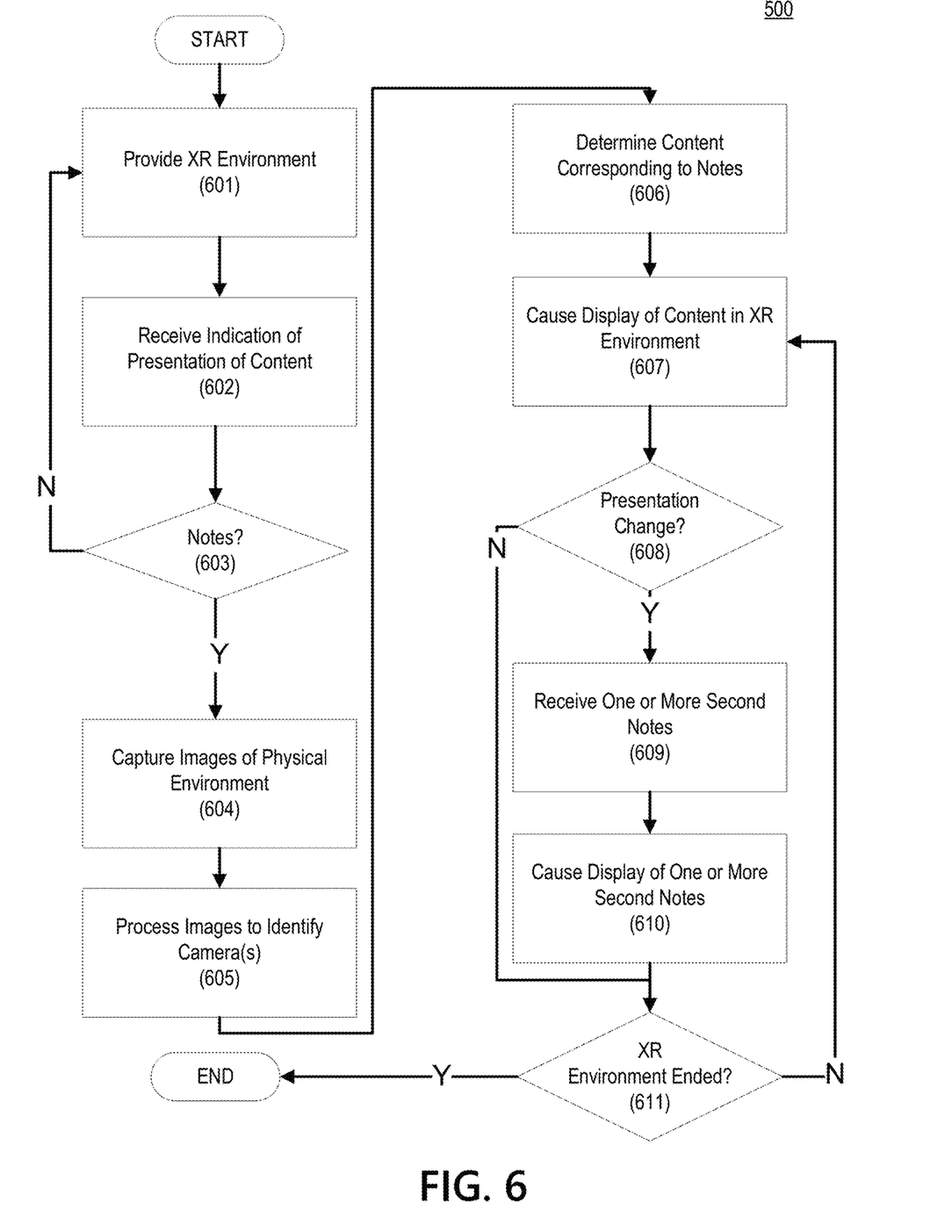
FIG. 6 depicts a flow chart for handling notifications in an XR environment.

FIG. 6 depicts a flow chart depicting steps of a method 600 for implementing notes in XR environments during presentations. The steps shown in FIG. 6 may be performed by all or portions of a computing device, such as the external computing device 204, the internal computing device 201, the server 401, or the like. A computing device comprising one or more processors and memory storing instructions may be configured such that the instructions, when executed, cause performance of one or more of the steps of FIG. 6. The steps depicted in FIG. 6 are illustrative, and may be rearranged or omitted as desired.

In step 601, the computing device may provide an XR environment. The XR environment may be provided by an XR device, such as the XR device 202. For example, the computing device may provide, to a user and via an XR device, an XR environment. The XR environment may be all or portions of a virtual reality, augmented reality, and/or mixed reality environment. As such, the XR environment may display one or more virtual elements (e.g., virtual objects generated by the internal computing device 201 and/or the external computing device 204) and/or one or more real-life physical elements (e.g., real objects in a physical environment around the XR device 202).

In step 602, the computing device may receive one or more indications of presentation of content. The one or more indications may be any form of information that indicates that content (e.g., a speech, a presentation, a slide deck) is being presented by a user. The computing device may receive an indication that the user is presenting content by, for example, detecting that a webcam is on, by detecting that a microphone is currently capturing user speech, by detecting that certain applications (e.g., a slide deck presentation application) is executing, or the like. Additionally and/or alternatively, a user may provide the one or more indications of presentation of content manually by, for example, pressing a button in a user interface.

The computing device may detect that content is being presented via one or more office suite APIs. Such office suite APIs may comprise, for example, APIs associated with the MICROSOFT OFFICE suite of applications developed by Microsoft Corporation of Redmond, WA For example, the indication that the user is presenting content may comprise an indication, from an API of an office suite application like a slide presentation application, that a slide of a presentation is being presented.

In step 603, the computing device may determine whether there are any notes corresponding to the content. Notes may comprise any form of content (e.g., text, audio, video, images, and/or any combination thereof) that may be associated with the presentation of other content (e.g., a speech, presentation slides, a performance, and/or any combination thereof). In some circumstances, notes may comprise textual content describing and/or augmenting a presentation. For example, a slide in a slide deck may have textual notes that outline what a speaker intends to say when presenting the slide. As another example, a performance may have textual notes that comprise a script. As yet another example, a speech may be associated with textual notes for the speaker, such as a reminder to slow down, speak clearly, and the like. If there are any notes corresponding to the content, then the method 600 proceeds to step 604. Otherwise, if there are not any notes corresponding to the content, then the method 600 returns to step 601.

Determining whether there are any notes may comprise determining whether content exists in a notes section of a slide deck. Many presentation-making applications permit users to create notes (e.g., speaker notes) for each slide. In such a circumstance, determining whether there are any notes may comprise determining, for a particular slide, whether the user has, using the presentation-making application, added content into the notes field corresponding to the particular slide.

Determining whether there are any notes may comprise retrieving information about the notes from one or more external sources. Notes may be additionally and/or alternatively stored on one or more remote devices, such as the server 401. As such, determining whether there are any notes may comprise querying one or more remote devices to determine whether the one or more remote devices store notes corresponding to content currently being presented. For example, the computing device may determine an identifier of the content (e.g., a slide number, an identification of a performance being shown) and then retrieve, from a server and based on the identifier of the content, the text (e.g., textual notes for a particular slide, a script corresponding to the performance being shown).

In step 604, the computing device may capture one or more images of a physical environment. Capturing the one or more images of the physical environment may comprise use of one or more cameras of an XR device, such as the cameras 203*d* of the XR device 202. For example, the computing device may capture, using a first camera of the XR device, one or more images of a physical environment around the XR device. Each of the one or more images may correspond to a different portion of the physical environment, may correspond to the physical environment at a different time, and/or some combination thereof. For example, the XR device 202 may capture a series of five images across five seconds as a user turns their head while wearing the XR device 202, such that each image of the five images comprises a different portion of a physical environment across a five-second period. With that said, the one or more images of the physical environment need not be comprehensive. After all, because a user may wear an XR device (e.g., the XR device 202) while making a presentation, the likelihood that the user is (and the cameras of the XR device 202 are) oriented towards a camera used during that presentation is somewhat high.

In step 605, the computing device may process the images to identify one or more cameras. One or more algorithms, such as object recognition algorithms, may be used to process various objects in the physical environment to identify a location of at least one camera. For example, the computing device may process the one or more images to identify a first location, in the physical environment around the XR device, of a second camera. In this manner, the computing device may determine the presence of a camera being used as part of a presentation.

As indicated above, processing the one or more images may comprise performing object detection. Cameras may be present in a variety of different devices (e.g., web cameras, laptops, smartphones), such that the computing device may infer the presence of a camera based on the presence of certain objects in the physical environment. In turn, the computing device may process the one or more images to identify one or more objects in the physical environment around the XR device, and then determine that at least one of the one or more objects comprises the second camera. With that said, it is not necessary that the computing device identify every possible camera in the physical environment. Rather, as part of processing the images to identify the one or more cameras, the computing device may determine a likelihood that an object that may comprise a camera is being used as part of a presentation. That likelihood may be based on the location(s) of the cameras (e.g., such that cameras in front of the user are more likely to be used than ones to the side of the user), one or more applications open on computing devices nearby the user (e.g., such that a laptop's webcam is more likely to be used for a presentation when the laptop is executing a videoconferencing application), and the like. In turn, based on a likelihood for a particular camera satisfying a threshold, the computing device may identify that particular camera as being used for a presentation. After all, it may be somewhat more likely that a speaker uses a laptop webcam for a presentation as compared to their smartphone, particularly in circumstances where (for example) a slide is already open on the laptop.

Processing the one or more images may entail use of a machine learning model, such as may be implemented via the deep neural network architecture 300 of FIG. 3. A machine learning model may be trained using training data that comprises a plurality of images of different cameras. Those images may be tagged to indicate the location of one or more cameras. In this manner, the training data may be tagged training data, such that the machine learning model is trained to identify, in one or more images, the location of one or more cameras. The trained machine learning model may be provided input data comprising the one or more images captured as part of step 604. The trained machine learning model may provide output comprising an indication of a location of one or more cameras. For example, the trained machine learning model may provide output comprising coordinates of a predicted camera. Based on subsequent activity of the user (e.g., if a user confirms using a user interface whether a camera is in fact located in the location identified by the trained machine learning model), the trained machine learning model may be further trained. For example, one or more node weights may be adjusted based on whether the trained machine learning model correctly identified coordinates, in the one or more images captured as part of step 604, corresponding to one or more cameras.

In step 606, the computing device may determine content corresponding to the notes determined in step 603. In this way, the computing device may retrieve video, audio, text, and/or other data corresponding to the content. For example, based on determining that notes existed in step 603, the computing device may retrieve all or portions of those notes in step 606. This process may comprise extracting text from a notes section of a slide deck, retrieving such content (e.g., text) from a remote server (e.g., the server 401), or the like.

In step 607, the computing device may cause display of the content determined in step 606 in the XR environment provided in step 601. The content may be displayed in a location based on the location of the camera(s) identified in step 605, such that users' eyes are directed towards the camera (instead of, e.g., towards a display screen with the notes). For example, the computing device may cause display, in the XR environment and based on the first location, of the text so as to orient eyes of the user toward the second camera during presentation of the content. In this manner, during a presentation, a user may speak naturally and appear as if the user is speaking to the camera, even if the user is in fact looking at their own notes. An example of how this may be seen from the perspective of the user is provided with respect to FIG. 7, which is discussed below.

During display of the content determined in step 606, the content need not be perfectly located at the exact position of the camera(s) identified in step 605. In many cases, a user's eyes may appear to be directed substantially at a camera even if, for example, their eyes are in fact slightly pointed away from the camera. As such, the content displayed as part of step 607 need not be perfectly located in front of the identified camera(s), but may instead be positioned next to, and/or otherwise nearby, the camera(s). An example of this sort of configuration is provided as part of FIG. 7, which is discussed below.

Causing display of the content in the XR environment may comprise the generation and/or display of one or more virtual objects. A virtual object may comprise any object generated by a computing device and displayed in an XR environment, such that the object is visible to one or more users of an XR device. For example, the computing device may cause display of text of notes by causing display, in the XR environment, of a virtual object that comprises the text. The virtual object may, for example, comprise some user interface element (e.g., a box, a window, a pop-up) that appears in some location associated with the camera(s) identified in step 605. In this manner, as indicated above, the user may appear to look at the camera(s), even if the user is in fact looking at the virtual object.

As part of causing display of the content in the XR environment, the computing device may prevent display of that content elsewhere. Various display devices may be in the physical environment, such that the display devices may display the same content (e.g., slide notes) being displayed in the XR environment. This can be a problem, as it may tempt the user to divert their gaze towards the display devices, rather than the content shown in the XR environment. In turn, as part of causing display of the content in the XR environment, the computing device may prevent display of the same content on other display devices. For example, the computing device may prevent display, by a display device, of the text.

The location of the content may be based on a boundary corresponding to a display device. This may be advantageous to ensure that a user can continue to reference all content on a display device while additionally referencing the virtual objects. As such, display of one or more virtual objects may be configured such that the virtual objects are not placed in a manner that would obscure all or portions of a display device in a physical environment of a user.

To avoid obscuring all or portions of a display device with content, the computing device may be configured to determine a boundary of a display device. In this manner, the computing device may be configured to determine coordinates corresponding to corners of a display device, such as a television and/or a computer monitor. For example, the computing device may use computer vision techniques to identify a boundary of a display device. Such computer vision techniques may comprise, for instance, techniques to identify a substantially rectangular region that is likely to be part of a display device. As another example, a boundary of a display device should be determined using a machine learning model, such as may be implemented via the deep neural network architecture 300 of FIG. 3. For example, a machine learning model may be trained to identify boundaries of display devices based on training data comprising images of display devices and indications of the boundaries of those display devices. The computing device may then provide, as input to the trained machine learning model, the images captured as part of step 604. The computing device may receive, as output from the trained machine learning model, an indication of one or more boundaries of one or more display devices in the physical environment. In this manner, the trained machine learning model may indicate, to the computing device, one or more boundaries of display devices in the physical environment. Additionally and/or alternatively, a combination of computer vision techniques and the aforementioned trained machine learning model may be used. For example, a machine learning model might be trained to output indications of a location of a monitor based on training data indicating images of monitors. These indications might be approximate, such that the trained machine learning model need not identify the boundary of a display device outright. The computing device may then provide, as input to the trained machine learning model, the images captured as part of step 604. The computing device may then receive, as output from the trained machine learning model, an indication of a location of a display device, such as a monitor. The computing device may then execute one or more computer vision algorithms on portions of the images captured as part of step 604 at the location identified by the trained machine learning model. The result of those executed computer vision algorithms may comprise, for example, an indication of a boundary of one or more computing devices in the physical environment. In any such circumstance, the location of the boundary need not be perfect. For example, notes may be placed a minimum distance away from an identified boundary such that, even if the identified boundary is somewhat imprecise, the notes would still remain sufficiently away from the real boundary of a display device.

More broadly, the location of the content may be determined through use of a machine learning model, such as may be implemented via the deep neural network architecture 300 of FIG. 3. A machine learning model may be trained to recommend the location of a virtual object in an XR environment based on training data indicating the location of user interface elements manually located by users in the XR environment. For example, the training data may indicate that, when given the opportunity during a presentation, users typically place lengthy text notes to the left of a camera, scripts in front of a camera, and reminder notes (e.g., "Speak Slowly!") to the right of a camera, but users never put their notes below the camera. In this manner, the trained machine learning model may be trained to output recommendations regarding the location of content, such as the content determined in step 606. The trained machine learning model may then be provided, as input, at least a portion of the content determined in step 606. The trained machine learning model may then provide, as output, an indication of a recommended location for a virtual object comprising the content determined in step 606. If the user subsequently moves the virtual object (e.g., using an input device associated with the XR device), then the trained machine learning model may be further trained based on the change. After all, if a user moves content from a recommended location to a new location, this change may suggest that the trained machine learning model recommended a poor location for that content.

The location of the content may be based, in whole or in part, on user preferences. A user may specify one or more locations for the content. For example, the user may drag a representation of the content to a location in the XR environment so as to indicate a location where the content should be located. Additionally and/or alternatively, the user may specify preferences for where the content should be located by, e.g., specifying where the content should be located in relation to a camera (e.g., in front of the camera, next to the camera), a preferred location of the content (e.g., to the left, to the right), a size of the content (e.g., a font size of the content, a size of a window containing the content), or the like. The user may move content being displayed in the XR environment by, for example, using an input device to cause the content to be moved (e.g., by clicking-and-dragging the content from one location or another). Such actions may cause the computing device to store a user preference. For example, if a user repeatedly moves the content to the left of a camera, then the computing device may determine that the user prefers locating the content to the left of a camera. As another example, if the user repeatedly uses a gesture to cause the font size of the content to become larger, then the computing device may increase a default font size of the content.

In step 608, the computing device may determine whether there has been a change in presentation. For example, the computing device may receive a second indication that the user has switched from presenting the content to presenting second content. A change in presentation may comprise any change to the content being presented, such as a slide change, a change in script, a change in topic, or the like. As such, a change in presentation may be detected by detecting a slide change, by detecting a pause in speech by the user (as captured by a microphone, such as may be part of the audio devices 203b of the XR device 202), by detecting a trigger word spoken by the user (e.g., "moving on," "next slide"), or the like.

In step 609, the computing device may receive one or more second notes associated with the change in the presentation determined in step 608. This step may be the same or similar as step 603 and/or step 606, albeit in view of the change in the presentation determined in step 608. For example, the computing device may, in response to receiving the second indication, retrieve one or more second notes corresponding to the second content. In this manner, for example, the computing device may retrieve one or more second notes for a subsequent slide being discussed during a presentation.

In step 610, the computing device may cause display of the one or more second notes. This step may be the same or similar as step 607, albeit such that additional and/or different notes may be displayed. For example, the computing device may cause display, in the XR environment and based on the first location, of the one or more second notes. In this way, while some notes from a previous slide may persist (e.g., general notes for use across an entire presentation, such as a reminder to speak slowly), other notes from a previous slide may be removed and/or replaced.

In step 611, the computing device may determine whether the XR environment has ended. This step may, in practice, implement a loop, whereby the process continues to display different notes for different content so long as content is being presented and so long as the XR environment persists. If the XR environment has ended, the method 600 ends. Otherwise, the method 600 returns to step 607.

Figure 7:
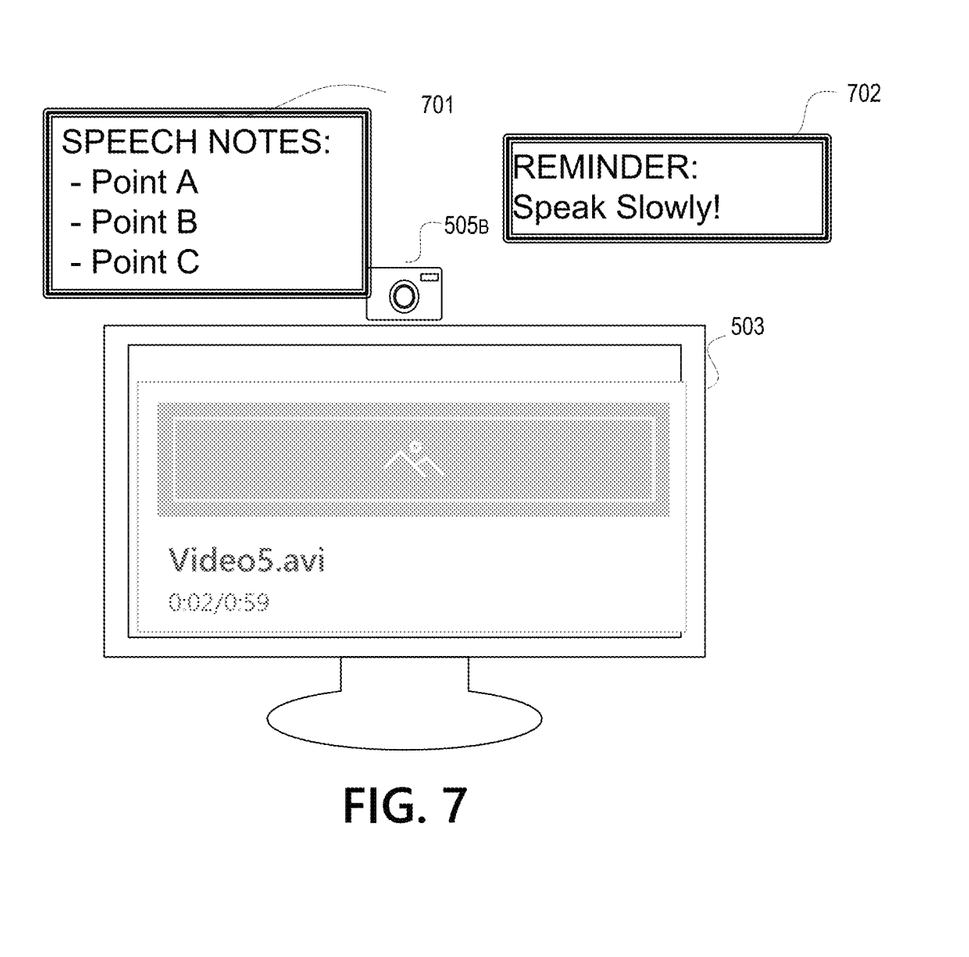
FIG. 7 depicts display, in an XR environment, of virtual objects comprising speech notes and a speech reminder.

FIG. 7 depicts virtual objects comprising notes for a speech. More particularly, FIG. 7 depicts the second camera 505b on top of the television 503. FIG. 7 also depicts two virtual objects: a first virtual object 701 displayed, in an XR environment, at approximately the location of the second camera 505b and away from a boundary of the television 503, and a second virtual object 702 displayed, in the XR environment, slightly further away from the second camera 505b and away from the boundary of the television 503. As indicated above, by virtue of being away from the boundary of the television 503, neither the first virtual object 701 nor the second virtual object 702 obscure content which may be displayed by the television 503. The first virtual object 701 relates to speech notes, and the second virtual object 702 relates to a reminder to speak slowly. In this manner, both virtual objects are positioned, with respect to the second camera 505b, in a manner which ensures that a speaker's eyes will be substantially directed toward the second camera 505b, even when the speaker may in fact be reading their notes. With that said, neither virtual object need be placed directly at the location of the lens of the second camera 505b. After all, especially at further distances, viewers of the video captured via the second camera 505b might not be able to easily distinguish between, for example, the speaker looking at the second virtual object 702 and the second camera 505b.

The following paragraphs (M1) through (M7) describe examples of methods that may be implemented in accordance with the present disclosure.

(M1) A method comprising: providing, to a user and via an Extended Reality (XR) device, an XR environment; receiving an indication that the user is presenting content; capturing, using a first camera of the XR device, one or more images of a physical environment around the XR device; processing the one or more images to identify a first location, in the physical environment around the XR device, of a second camera; retrieving text corresponding to the content; and causing display, in the XR environment and based on the first location, of the text so as to orient eyes of the user toward the second camera during presentation of the content.

(M2) The method described in paragraph (M1), wherein processing the one or more images to identify the first location comprises: processing the one or more images to identify one or more objects in the physical environment around the XR device; and determining that at least one of the one or more objects comprises the second camera.

(M3) The method described in paragraph (M1) or (M2), wherein the indication that the user is presenting content comprises an indication, from an Application Programming Interface (API) of an office suite application, that a slide of a presentation is being presented.

(M4) The method described in any one of paragraphs (M1)-(M3), wherein retrieving the text corresponding to the content comprises: determining an identifier of the content; and retrieving, from a server and based on the identifier of the content, the text.

(M5) The method described in any one of paragraphs (M1)-(M4), further comprising: receiving a second indication that the user has switched from presenting the content to presenting second content; in response to receiving the second indication, retrieving one or more second notes corresponding to the second content; and causing display, in the XR environment and based on the first location, of the one or more second notes.

(M6) The method described in any one of paragraphs (M1)-(M5), wherein causing display of the text comprises causing display, in the XR environment, of a virtual object that comprises the text.

(M7) The method described in any one of paragraphs (M1)-(M6), further comprising: preventing display, by a display device, of the text.

The following paragraphs (A1) through (A7) describe examples of apparatuses that may be implemented in accordance with the present disclosure.

(A1) A computing device comprising: one or more processors; and memory storing instructions that, when executed by the one or more processors, cause the computing device to: provide, to a user and via an Extended Reality (XR) device, an XR environment; receive an indication that the user is presenting content; capture, using a first camera of the XR device, one or more images of a physical environment around the XR device; process the one or more images to identify a first location, in the physical environment around the XR device, of a second camera; retrieve text corresponding to the content; and cause display, in the XR environment and based on the first location, of the text so as to orient eyes of the user toward the second camera during presentation of the content.

(A2) The computing device described in paragraph (A1), wherein the instructions, when executed by the one or more processors, further cause the computing device to process the one or more images to identify the first location by causing the computing device to: process the one or more images to identify one or more objects in the physical environment around the XR device; and determine that at least one of the one or more objects comprises the second camera.

(A3) The computing device described in paragraph (A1) or (A2), wherein the indication that the user is presenting content comprises an indication, from an Application Programming Interface (API) of an office suite application, that a slide of a presentation is being presented.

(A4) The computing device described in any one of paragraphs (A1)-(A3), wherein the instructions, when executed by the one or more processors, further cause the computing device to retrieve the text corresponding to the content by causing the computing device to: determine an identifier of the content; and retrieve, from a server and based on the identifier of the content, the text.

(A5) The computing device described in any one of paragraphs (A1)-(A4), wherein the instructions, when executed by the one or more processors, further cause the computing device to: receive a second indication that the user has switched from presenting the content to presenting second content; in response to receiving the second indication, retrieve one or more second notes corresponding to the second content; and cause display, in the XR environment and based on the first location, of the one or more second notes.

(A6) The computing device described in any one of paragraphs (A1)-(A5), wherein the instructions, when executed by the one or more processors, further cause the computing device to cause display of the text by causing display, in the XR environment, of a virtual object that comprises the text.

(A7) The computing device described in any one of paragraphs (A1)-(A6), wherein the instructions, when executed by the one or more processors, further cause the computing device to: prevent display, by a display device, of the text.

The following paragraphs (CRM1) through (CRM7) describe examples of computer-readable media that may be implemented in accordance with the present disclosure.

(CRM1) One or more non-transitory computer-readable media comprising instructions that, when executed by one or more processors of a computing device, cause the computing device to: provide, to a user and via an Extended Reality (XR) device, an XR environment; receive an indication that the user is presenting content; capture, using a first camera of the XR device, one or more images of a physical environment around the XR device; process the one or more images to identify a first location, in the physical environment around the XR device, of a second camera; retrieve text corresponding to the content; and cause display, in the XR environment and based on the first location, of the text so as to orient eyes of the user toward the second camera during presentation of the content.

(CRM2) The non-transitory computer-readable media described in paragraph (CRM1), wherein the instructions, when executed by the one or more processors, further cause the computing device to process the one or more images to identify the first location by causing the computing device to: process the one or more images to identify one or more objects in the physical environment around the XR device; and determine that at least one of the one or more objects comprises the second camera.

(CRM3) The non-transitory computer-readable media described in paragraph (CRM1) or (CRM2), wherein the indication that the user is presenting content comprises an indication, from an Application Programming Interface (API) of an office suite application, that a slide of a presentation is being presented.

(CRM4) The non-transitory computer-readable media described in any one of paragraphs (CRM1)-(CRM3), wherein the instructions, when executed by the one or more processors, further cause the computing device to retrieve the text corresponding to the content by causing the computing device to: determine an identifier of the content; and retrieve, from a server and based on the identifier of the content, the text.

(CRM5) The non-transitory computer-readable media described in any one of paragraphs (CRM1)-(CRM4), wherein the instructions, when executed by the one or more processors, further cause the computing device to: receive a second indication that the user has switched from presenting the content to presenting second content; in response to receiving the second indication, retrieve one or more second notes corresponding to the second content; and cause display, in the XR environment and based on the first location, of the one or more second notes.

(CRM6) The non-transitory computer-readable media described in any one of paragraphs (CRM1)-(CRM5), wherein the instructions, when executed by the one or more processors, further cause the computing device to cause display of the text by causing display, in the XR environment, of a virtual object that comprises the text.

(CRM7) The computing device described in any one of paragraphs (CRM1)-(CRM 6), wherein the instructions, when executed by the one or more processors, further cause the computing device to: prevent display, by a display device, of the text.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device comprising:
one or more processors; and
memory storing instructions that, when executed by the one or more processors, cause the computing device to:
provide, to a user and via an Extended Reality (XR) device, an XR environment;
receive an indication that the user is presenting content;
capture, using a first camera of the XR device, one or more images of a physical environment around the XR device;
process the one or more images to identify a first location, in the physical environment around the XR device, of a second camera;
retrieve text corresponding to the content; and
cause display, in the XR environment and based on the first location, of the text so as to orient eyes of the user toward the second camera during presentation of the content.

2. The computing device of claim 1, wherein the instructions, when executed by the one or more processors, further cause the computing device to process the one or more images to identify the first location by causing the computing device to:
process the one or more images to identify one or more objects in the physical environment around the XR device; and
determine that at least one of the one or more objects comprises the second camera.

3. The computing device of claim 1, wherein the indication that the user is presenting content comprises an indication, from an Application Programming Interface (API) of an office suite application, that a slide of a presentation is being presented.

4. The computing device of claim 1, wherein the instructions, when executed by the one or more processors, further cause the computing device to retrieve the text corresponding to the content by causing the computing device to:
determine an identifier of the content; and
retrieve, from a server and based on the identifier of the content, the text.

5. The computing device of claim 1, wherein the instructions, when executed by the one or more processors, further cause the computing device to:
receive a second indication that the user has switched from presenting the content to presenting second content;
in response to receiving the second indication, retrieve one or more second notes corresponding to the second content; and
cause display, in the XR environment and based on the first location, of the one or more second notes.

6. The computing device of claim 1, wherein the instructions, when executed by the one or more processors, further cause the computing device to cause display of the text by causing display, in the XR environment, of a virtual object that comprises the text.

7. The computing device of claim 1, wherein the instructions, when executed by the one or more processors, further cause the computing device to:
prevent display, by a display device, of the text.

8. A method comprising:
providing, to a user and via an Extended Reality (XR) device, an XR environment;
receiving an indication that the user is presenting content;
capturing, using a first camera of the XR device, one or more images of a physical environment around the XR device;
processing the one or more images to identify a first location, in the physical environment around the XR device, of a second camera;
retrieving text corresponding to the content; and
causing display, in the XR environment and based on the first location, of the text so as to orient eyes of the user toward the second camera during presentation of the content.

9. The method of claim 8, wherein processing the one or more images to identify the first location comprises:
processing the one or more images to identify one or more objects in the physical environment around the XR device; and
determining that at least one of the one or more objects comprises the second camera.

10. The method of claim 8, wherein the indication that the user is presenting content comprises an indication, from an Application Programming Interface (API) of an office suite application, that a slide of a presentation is being presented.

11. The method of claim 8, wherein retrieving the text corresponding to the content comprises:
determining an identifier of the content; and
retrieving, from a server and based on the identifier of the content, the text.

12. The method of claim 8, further comprising:
receiving a second indication that the user has switched from presenting the content to presenting second content;
in response to receiving the second indication, retrieving one or more second notes corresponding to the second content; and
causing display, in the XR environment and based on the first location, of the one or more second notes.

13. The method of claim 8, wherein causing display of the text comprises causing display, in the XR environment, of a virtual object that comprises the text.

14. The method of claim 8, further comprising:
preventing display, by a display device, of the text.

15. One or more non-transitory computer-readable media comprising instructions that, when executed by one or more processors of a computing device, cause the computing device to:
provide, to a user and via an Extended Reality (XR) device, an XR environment;
receive an indication that the user is presenting content;
capture, using a first camera of the XR device, one or more images of a physical environment around the XR device;
process the one or more images to identify a first location, in the physical environment around the XR device, of a second camera;
retrieve text corresponding to the content; and
cause display, in the XR environment and based on the first location, of the text so as to orient eyes of the user toward the second camera during presentation of the content.

16. The non-transitory computer-readable media of claim 15, wherein the instructions, when executed by the one or more processors, further cause the computing device to process the one or more images to identify the first location by causing the computing device to:
process the one or more images to identify one or more objects in the physical environment around the XR device; and
determine that at least one of the one or more objects comprises the second camera.

17. The non-transitory computer-readable media of claim 15, wherein the indication that the user is presenting content comprises an indication, from an Application Programming Interface (API) of an office suite application, that a slide of a presentation is being presented.

18. The non-transitory computer-readable media of claim 15, wherein the instructions, when executed by the one or more processors, further cause the computing device to retrieve the text corresponding to the content by causing the computing device to:
determine an identifier of the content; and
retrieve, from a server and based on the identifier of the content, the text.

19. The non-transitory computer-readable media of claim 15, wherein the instructions, when executed by the one or more processors, further cause the computing device to:
receive a second indication that the user has switched from presenting the content to presenting second content;
in response to receiving the second indication, retrieve one or more second notes corresponding to the second content; and
cause display, in the XR environment and based on the first location, of the one or more second notes.

20. The non-transitory computer-readable media of claim 15, wherein the instructions, when executed by the one or more processors, further cause the computing device to cause display of the text by causing display, in the XR environment, of a virtual object that comprises the text.

* * * * *